124,420

UNITED STATES PATENT OFFICE.

SETH L. COLE, OF BROOKLYN, NEW YORK.

IMPROVEMENT IN PROCESSES OF PRESERVING WOOD.

Specification forming part of Letters Patent No. 124,420, dated March 12, 1872; antedated March 2, 1872.

*To all whom it may concern:*

Be it known that I, SETH L. COLE, of the city of Brooklyn, in the county of Kings and State of New York, have invented a new and useful Process for Preserving Wood by introducing into the air-vessels and sap-chambers thereof the liquid products resulting from the destructive distillation of pine wood, by means of either hydrostatic, pneumatic, steam, or other power, so as to impregnate the entire log under pressure; and I hereby declare in what manner the same is be effected by a full, clear, and exact description thereof, reference being had to the following specification; and in order that the public may fully understand the nature of my invention, I will describe it as follows, to wit:

I am aware that numberless experiments have been made on the preservation of timber both in this country and Europe, and the means generally resorted to have been the saturation of the timber in the solution of some of the salts having a metallic or earthy base, which produces an insoluble compound with the soluble matter of the wood. The salts that are in common use for such purposes are the sulphate of iron or copper and the chloride of either mercury, zinc, or calcium. The most satisfactory results are obtained from the chlorides which have the antiseptic properties of resisting putrefaction or decay; but in my opinion the salts with metallic bases have an injurious effect upon the timber from the fact that the free sulphuric acid produced by the chemical action of the salts upon the wood destroys its fiber and changes it into a brittle substance resembling a carbonaceous formation; hence its elasticity is in a measure lost. Chloride of mercury in solution proportioned one pound of the salt to five gallons of water, or a solution of the chloride of zinc in the proportion of one pound of salt to about ten gallons of water, are also used for preservative purposes; and to render the wood non-combustible stronger solutions of these salts are necessary. In order to preserve the elasticity of the fibers of the wood those salts which have the quality of absorbing the watery particles from the atmosphere, and thus becoming deliquescent themselves by their spontaneous liquefaction in the air, such as the chloride of calcium, which also protects the wood against fire after it becomes concentrated in the sap-chambers and other pores of the timber, and in a measure prevents the wood from checking and warping, are used. Water from the salt-marshes is found to be equally good for the above purpose; but the greatest objection is the great increase of the weight of the timber. Coal-tar is in common use for impregnating timber against the ship-worm. Marine glue mixed with poisons that destroy animal life has also been employed for the same thing. The well-known process of coating timber with paint, pitch, or hot oil, or slightly charring it over with a light blaze, is only serviceable for a short time, excepting in situations where it can be frequently renewed; and where green timber is thus coated it has a tendency to a more rapid decay from the fact that the pores of the surface of the wood are stopped by the paint, oil, or pitch, thus preventing any escape of the moisture contained in the wood, which is one of the first causes of decomposition. I am also aware that creosote for preserving lumber is well known; hence I do not pretend to have invented either of the above described, separately, for the purpose set forth; but my invention consists in the use of all the compound products from the distillation of pine wood, as produced in a closed retort by me under my improved process for making turpentine, patented on the 19th of May, 1863, and again on the 1st of December, 1863; by which process I first produce the watery particles, then the white turpentine. The next product which is discharged is the red oil, which is found to contain the greatest amount of wood-preserving properties. Then follows the creosote, whose virtues are well known. The tar comes next, leaving the residuum pitch. All of these products having passed through a chemical change by the application of heat are left in a highly liquid limpid state in one conglomerate mass, to form the liquid compound with which I impregnate or charge the air-cells and sap-chambers of any kind of wood or timber by first expelling all the air and sap by pressure produced at one end of the log, by means of any hermetical cap being first secured over and around the end of the stick next to the apparatus, to prevent the escape of the liquid extract of pine wood as it is forced into the pores of the log.

To enable those who are skilled in the mechanic arts to more fully and clearly understand the chemical nature of my wood-preserving liquid compound, I will describe the individual parts as set forth by "Doctor Richenbach," whose authority is well known, to wit:

Turpentine is one of the products obtained from pine wood by destructive distillation of the *Pinus palustris*, or southern pine of the United States, and other species. This pine is commonly known as the swamp pine. It yields about seventeen per cent. of the oil which may be obtained by distilling the common turpentine with or without water. The next important product is the red oil, which partakes of the virtues of both the rosin and creosote, and being mixed with the wood, naphtha, turpentine, and other volatile substances, it is extremely liquefied; and while in that state it more readily enters the pores of the wood, where it remains (after the rapid evaporation of the volatile oils has taken place) in a more solid form to the exclusion of both air and water, thus preventing decomposition of the surrounding fibers. Creosote is obtained from wood-tar by distillation, and is of the nature of volatile oils. It is separated by heat from the resin of wood, and is "isomeric with the original volatile oil. It may therefore be classed with the volatile oils," which are regenerated by distillation. Creosote is also obtained from pyroligneous acid. To obtain it from wood-tar the latter must be distilled until it becomes the consistency of pitch, when it will divide itself into three layers—viz.: a watery or aqueous between two oily layers. The inferior oily layer contains the creosote alone, and in order to obtain it in a pure state it must be saturated with carbonate of potassa to remove the acetic acid. The most remarkable of its properties is its power to preserve meat, from which fact it derives its name. It has also been found of great utility for preserving wood in combination with metallic or earthy salts. Tar is made from various species of pine wood, particularly *Pinus palustris* of the southern States. The dead wood is better adapted for this purpose, from the fact that when vegetation ceases the resinous matter becomes concentrated in the interior layers, and more readily produces tar at less heat. This tar has a peculiar empyreumatic smell, a bitterish, resinous, and somewhat acid taste, color almost black, and tenacious consistence between that of a liquid and a solid. Its composition consists of the resinous matter united with acetic acid, oil of turpentine, and various volatile empyreumatic products, and colored with charcoal during the process of distillation. It yields an acid liquor called pyroligneous acid, with a dark-burned oil called the oil of tar, and the residuum is pitch. Tar contains, besides the oil of turpentine, six distinct principles—called paraffine, eupion, creosote, picamar, kapnomar, and pittacal. Of these only the picamar and creosote are the most worthy of notice. To the former the tar owes its bitterness of taste, and to the latter its virtues. It dissolves readily in either alcohol, volatile, or fixed oils.

After thus setting forth the individual properties of the principal products obtained from the destructive distillation by my patent process aforesaid "for producing oil or spirits of turpentine, and other analogous oils, from pine wood," excepting resin-oil, which I believe becomes extinct by the destructive distillation of the wood aforesaid, the residuum thereof would be simply tar and pitch after the volatile matter has been driven off by heat in vacuo. But this invention is confined to the use of all the products thus obtained while in the moist liquid or fluid state and while they are being held in that condition by the chemical action of the volatile oils, naptha, empyreumatic volatile products, acids, &c., upon the tarry or pitchy portions of the liquid compound, which I force into the air and sap-chambers of the wood for the purpose of preserving the same, by first placing the conglomerate liquid mass into any suitable tank, from whence it passes into a pressure-chamber, where the steam, air, or other power forces it through any suitable tube into the air-tight cap, which may be secured over the end of the timber, by which means the wood-preserving liquid compound extract from the destructive distillation of pine wood is forced, by any suitable pressure, into the pores, air-cells, and sap-chambers of the timber by first displacing the natural sap and air of the wood, (to be preserved,) and substituting in lieu thereof the said liquid extract from destructive distillation of wood to coagulate and forming, in my opinion, one of the best wood-preserving agents against the injurious effects of the elements or worms that has ever been brought before the public, from the fact that I preserve the strength and elasticity of the fibers of the wood by dispensing with the many salts having mineral bases and their attending acids, and charging the pores of the timber without subjecting it to a high temperature, for the purpose of expelling the air and sap preparatory to charging the same with the above compound extract from the destructive distillation of pine wood. Hence the novelty of my invention consists in introducing into the sap-chambers and air-cells of wood, the combination of the products (in a liquid state) produced from the destructive distillation of pine wood in a closed retort, for the purpose of preserving the timber from decomposition or destruction by the worms or other insects; therefore, I do not claim resin-oil "in either a hot or cold state," or individually applied for the preservation of wood; neither do I claim the individual application of either of the above products for the purpose set forth; but

What I claim as my discovery, and wish to protect by Letters Patent of the United States, is—

The combination of the oil of turpentine, naphtha, creosote, paraffine, eupion, picamar, kapnomar, pittacal, oil of tar, pyroligenous acid, and the residuum pitch as produced by the destructive distillation of pine wood, in the manner and for the ostensible purpose set forth.

SETH L. COLE.

Witnesses:
   JAMES P. MCLEAN,
   ANNE S. MCLEAN.